United States Patent [19]

Durana et al.

[11] Patent Number: 5,235,181
[45] Date of Patent: Aug. 10, 1993

[54] ABSOLUTE POSITION DETECTOR FOR AN APPARATUS FOR MEASURING LINEAR ANGULAR VALUES

[75] Inventors: Miroslav Durana, Lausanne; Roland Gallay, Farvagny-le-Petit; Philippe Robert, Epalinges, all of Switzerland

[73] Assignee: Tesa, S.A., Switzerland

[21] Appl. No.: 804,769

[22] Filed: Dec. 9, 1991

[30] Foreign Application Priority Data

Dec. 10, 1990 [CH] Switzerland .................. 03892/90

[51] Int. Cl.[5] .............................................. G01D 5/34
[52] U.S. Cl. ........................... 250/231.18; 250/231.14; 250/237 G
[58] Field of Search ............. 250/231.18, 231.14, 250/237 G; 356/375; 33/707, 705

[56] References Cited

U.S. PATENT DOCUMENTS

| | | | | |
|---|---|---|---|---|
| 5,063,291 | 11/1991 | Buehring | ........................ | 250/237 G |
| 5,065,017 | 11/1991 | Hoech | ........................... | 250/237 G |
| 5,068,529 | 11/1991 | Ohno et al. | ................... | 250/231.18 |

FOREIGN PATENT DOCUMENTS 0165392  3/1985  European Pat. Off. .
0268558  11/1987  European Pat. Off. .
3818044  11/1989  Fed. Rep. of Germany .
58-227859  11/1985  Japan .

*Primary Examiner*—David C. Nelms
*Assistant Examiner*—Que T. Le
*Attorney, Agent, or Firm*—Anthony J. Casella; Gerald E. Hespos

[57] ABSTRACT

The detector comprises an optoelectronic sensing unit (3) and a transparent rule (2) having two parallel graduation tracks (4, 5). One track (5) has incremental graduation of constant step and the other track (4) has pseudo-random graduation forming binary coding bits constituting a continuous sequence of words which are different from each other, the width of a bit being a function of the step of the incremental graduation. The incremental track (5) is read through a sensing graticule (9) by photodetectors (8) which are 90 electrical degrees out of phase in order to permit an interpolation in the step of said track. The track (4) with pseudo-random graduation is read by a CCD detector (11) through an image-enlarging lens (13). The signals generated are processed by circuits (15a, 15b) which assure the combining of the information taken from the two tracks of the rule.

10 Claims, 1 Drawing Sheet

ABSOLUTE POSITION DETECTOR FOR AN APPARATUS FOR MEASURING LINEAR ANGULAR VALUES

FIELD OF THE INVENTION

The present invention relates to a position detector for an apparatus for measuring linear or angular values, comprising a detector unit and a graduated rule or disk the relative displacements of which are detected by a detection device associated with the detection unit in order to produce, as a result of the passage of the graduation of the rule or disk, electric signals which are representative of the value of said relative displacements.

DESCRIPTION OF THE PRIOR ART

A position detector for an apparatus for the measurement of linear values is known which comprises a detector unit and a graduated rule of transparent material with contrasting graduation, formed of alternately transparent and opaque or reflecting parallel bars the relative displacements of which are detected by an optoelectronic detection device comprising photoemitting, photodetecting and optical means associated with the detection unit and adapted to produce the electric signals representative of the value of said relative displacements by variations of the irradiation of the photodetector means generated by the passage of the graduation of the rule.

This detector, which is the object, for example, of industrial applications, and in particular an apparatus used for the measurement and dimensional control of mechanical parts, comprises a rule with incremental graduation and a feeler graticule with complementary graduation associated with the feeler unit. The graticule is placed between the rule and the photodetector means in order to produce on the latter, under the effect of the irradiation of the photoemitter means, alternate light contrasts which generate sinusoidal alternate signals as a function of the value of the relative displacements of the rule and of the sensor unit, the latter being for instance associated with a slide moveable along the rule.

In order to obtain a very precise definition of the measurement, the sensor unit is equipped, in most of these measurement apparatus, with a group of four photodetectors, 90 electrical degrees apart, in order to produce signals in quadrature and permit an interpolation of them within each step of the incremental graduation of the rule.

This system of detection provides the advantages of rapidity and very fine definition of the measurement, the quantitative ratio of these two qualities being capable of being modulated by the selection of the multiplication factor of the interpolation.

However, it has an inherent drawback due to the fact that it gives only a relative measurement which is a function of the number of steps of the incremental graduation passed over during a displacement. Therefore, upon each loss of signal caused by a voluntary or accidental interruption of the electric power of the detector, the measurement is lost and the operator must again carry out at least part, if not all, of the measurement operations.

It is therefore always necessary to effect a setting to reference marks upon the turning on or renewed turning on, which constitutes a loss of time; furthermore, the displacement of the rule or slider may result in the risk of wear or even of breakage when tools are used or else when difficulties in access result in difficulty in resetting on the reference marks.

An absolute position detector employing optoelectronic means which does not suffer from the consequences of an accidental inter.ruption of power is described in the document U.S. Pat. No. 2126444.

In that detector, the rule has a graduation consisting of a pseudo-random distribution of parallel bars and spaces of the same width, constituting binary coding bits, forming a continuous sequence of words. These words are read by a photodetector having a network of diodes in sufficient number to be able simultaneously to read several bits of the pseudo-random sequence in order to identify the position along the rule.

The network of the photodetector comprises a plurality of diodes for each bit of the pseudo-random graduation, so that the absolute position of the transitions or bars of the pseudo-random graduation can be measured within the length of one bit.

Therefore, the measurement increment of this absolute position detector is equal, under the best reading conditions, to the step of the network of diodes of the photodetector.

A combination has been proposed in order to obtain the reading of an absolute position in which the rule comprises a composite graduation formed by the superimposing of an absolute graduation formed by a pseudo-random distribution of parallel bars and spaces of the same width forming binary coding bits which form a continuous sequence of words, and of an incremental graduation the bars of which are inscribed in the transparent bits of the pseudo-random sequence, the incremental step thus having to be substantially smaller than the width of one bit of the pseudo-random sequence. This composite graduation is read by a detector unit comprising a charge transfer detector (CCD) in order to read the pseudo-random graduation and a conventional assembly of four photodetectors 90 electrical degrees apart in order to read the incremental graduation present in the transparent bits of the pseudo-random sequence.

In this arrangement, and in the best selection of the ratio of the steps of the two graduations, a loss in luminosity of the incremental graduation of close to 50% results due to the pseudo-random graduation.

The interpolation necessary for the determination of the fine measurement within a step of the incremental graduation can be effected only due to the graduation present in the transparent bits of the pseudo-random sequence, which results in uncertainty as to the actual position of the step of the incremental graduation corresponding to the position sought. Furthermore, as this system can operate only for a step of the incremental graduation which is smaller than the width of a bit of the pseudo-random graduation, this results in the necessity of a rule/slide displacement which may reach the width of a bit of the pseudo-random graduation for resetting in case of loss of the signal.

SUMMARY OF THE INVENTION

The object of the invention is to permit an absolute position measurement which enjoys the advantages of rapidity and fine definition of a measurement by the incremental process without, however, having the limitations and drawbacks indicated above, in particular the loss of the absolute position and the necessity of resetting by relatively large displacements.

For this purpose, the detector in accordance with the invention complies with the definition given in claims.

In this way, as a result of the separation in two parallel tracks of the absolute and incremental graduations on the rule, as well as of their readings by the detector unit, the drawbacks and limitations produced by their overprinting and their simultaneous reading are eliminated. There is no longer, in fact, a loss of brightness of the incremental graduation or an interruption of the continuity thereof, and the limitation relative to the ratio of the step of this graduation with the width of a bit of the absolute graduation is eliminated, which makes it possible to modulate this ratio as a function of the characteristics of the optoelectronic components offered on the market and in view of the desired precision and reliability. Furthermore, the need for a rule/slide displacement for re-referencing upon engagement or in case of loss of signal, for instance by a power breakdown, disappears. Data as to details which result in additional advantageous effects will become evident from the following description.

BRIEF DESCRIPTION OF THE DRAWINGS

The accompanying drawing shows the object of the invention by way of example.

DESCRIPTION OF THE PREFERRED EMBODIMENT

Figure 1:
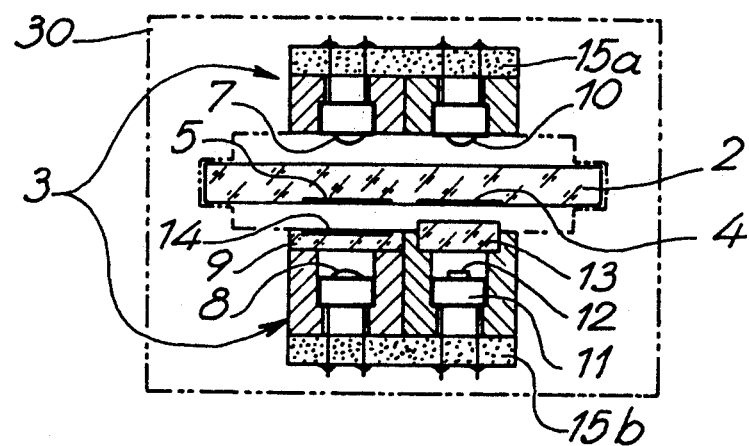
FIG. 1 is a diagrammatic overall view in cross section.
Figure 2:
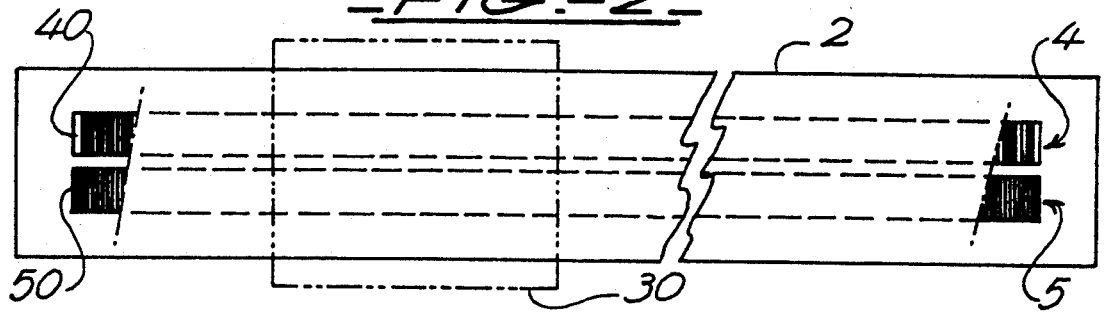
FIG. 2 is a top view of the rule.

The position detector shown comprises a transparent rule 2, for instance of optical glass, and a detector unit 3 mounted in a slide 30 which is movable by translation along said rule or vice versa, depending on the measurement apparatus with which this detector is associated.

The rule 2 has two parallel graduated tracks 4 and 5 the graduations of which are formed of parallel opaque bars 40 and 50, distributed perpendicular to its longitudinal direction.

The opaque bars 40 and 50 are made, for instance, by a method of engraving a layer of chromium 6 deposited on the optical glass of the rule.

One of the two tracks, track 5, is referred to as the incremental track; it has a distribution of equidistant bars 50 of step P, within which the bars and the spaces have the same width P/2.

The other track, track 4, is referred to as the absolute track; it has a pseudo-random distribution of bars 40 and spaces of the same width L constituting binary code bits, 1-0, forming a continuous sequence of words all different from each other.

Figure 3:
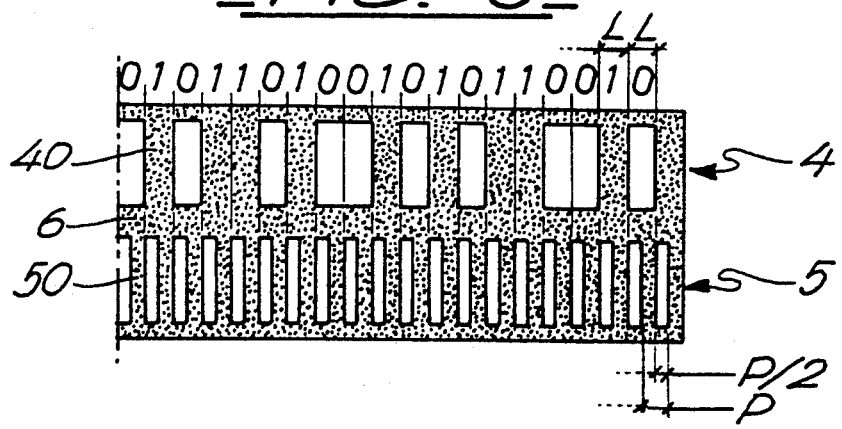
FIG. 3 is a partial view of the graduation of the rule.

In order to facilitate the design of the two-track rule and simplify the algorithm for calculation of the absolute value of the position reached, whatever it may be, the step P of the incremental graduation is a multiple or sub-multiple of the width L of the bars and spaces of the absolute graduation, as in FIG. 3 which shows the case P=L.

The sensor unit 3, FIG. 1, comprises: on the one hand, facing the incremental track 5 of the rule 2, on both sides thereof, a photoemitter 7 and a group of four photodetectors 8, only one of which is visible here, which are arranged 90 electrical degrees apart, one behind the other along said track, in order to produce signals in quadrature, a sensor graticule 9 for the graduation of said incremental track being placed between the rule 2 and the photoreceivers 8;

and, on the other hand, facing the absolute track 4 of the rule 2 and also on both sides of it, a photoemitter 10 and a charge transfer detector CCD of linear type 11 having a plurality of photodiodes 12, an optical lens 13 being placed here between the rule 2 and the CCD detector.

In this arrangement, graticule 9 for the sensing of the graduation of the incremental track 5 has a graduation 14 similar to the latter, of the same step or proportional step, established to produce, under the effect of the irradiation of the photodetectors 8 and through these graduations, alternating electric signals which are a function of the size of the relative displacements of the rule 2 and the sensor unit 3 to which this graticule is fastened.

The four photodetectors 8 arranged to produce signals in quadrature make it possible to effect an interpolation of these signals within each step P of the incremental track 5 so as to obtain a fine measurement of the position reached. However, it is possible to use only two photodetectors which are out of phase.

The CCD charge transfer detector 11 of linear type is adapted to read at least one complete word formed by a definite number of successive bits 1-0 of the absolute track 4, so as to permit the identification of the word of the pseudo-random sequence corresponding to the bits of high order of the code representing the absolute position reached.

The optical lens 13 is associated here with the detection system of the absolute track in order to obtain optimal optical efficiency and increase the resolution if necessary.

Figure 4:
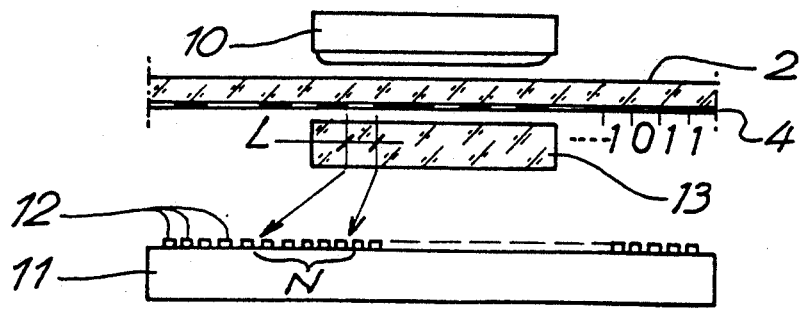
FIG. 4 is a partial diagrammatic side view of the assembly shown in FIG. 1.

This lens 13, the arrangement of which in the longitudinal direction of the rule 2 is shown in FIG. 4, is of a type suitable to produce an optical lengthening of the image, making it possible to perceive at least the length of one word of the absolute track 4 over the entire extent of the CCD detector 11. The optical lengthening factor of this lens 13 will preferably be selected so as to spread the image by one bit, of length L of the absolute track 4, over a number N equal to or greater than three photodiodes 12 of the CCD detector, which number is five in the drawing, and this in order to obtain uniformity in the degree of illumination of the central photodiode of the series of photodiodes thus influenced by each bit of the same nature, whatever its environment, formed by the other bits of the word read to be identified.

The optoelectronic elements of the detection unit can be selected preferably in infra-read technique, the photoemitters 7 and 10 being, for instance, formed of IR emitting diodes, the photoreceivers 8 of IR photodetectors and the photodiodes 12 of the CCD also of IR photodetectors, this for the advantage of their small consumption of electric power, for good quanta yield and for their good adaptation to rapid speeds of analysis, but it is obvious that this choice is not limitative.

The photoemitters 7 and 10, the photoreceivers 8, and the CCD detector 11 are connected to two printed circuits 15a and 15b for the feeding of these elements and the processing of the signals generated by the photoreceivers and the CCD.

The processing of the signals is effected by an electronic circuit (not shown) comprising means for decoding the signals resulting from the reading of the pseudo-random graduation of the absolute track 4 by the CCD detector 11 in order to permit the determination of the bits of high order, means for interpolating the signals in quadrature resulting from the reading of the incremental track 5 by the photodetectors 8 for the determination of the bits of low order within one step of this graduation, and means for combining the results obtained from the reading of the two tracks in order to be able to obtain at any time, without any resetting operation in case of breakdown, power failure or any other disturbance causing a momentary loss of the signal, the absolute position with the resolution suitable for the incremental track and its system of reading and decoding.

The means for decoding the signals coming from the absolute track can be formed, for instance, of a circuit comprising a comparator to compare the signals of the CCD detector with the pseudo-random binary sequences generated by a shift register and a counter determining the number of cycles of the shift register necessary in order to lead to the identity of the pseudo-random sequences read on the detector, on the one hand, and produced by the shift register, on the other hand.

These means may also consist of memories programmed to directly effect the translation of the pseudo-random sequence into absolute position.

The means for permitting the determination of the position within a step of the incremental track 5 can be formed, for instance, by a calculator by means of which the static angular position at the moment in question is calculated by solving the equation of the turning vector determined by the sine of one of the signals in quadrature and by the cosine of the other. The calculator then determines the number of measurement increments by dividing the value of the calculated angle by the size of the angle of one increment of the interpolation. The precision of this determination is dependent on the multiplication factor selected. Thus, for example, for a multiplication factor of 200 and a step P of the incremental track of $20\mu$, the resolution of one increment of the interpolation corresponds to $360°/200 = 1.8°$ and is equivalent to $0.1\mu$.

In the event that the calculation of the angular position should, for instance, be 75°, the number of increments would be equivalent to a measurement of $(75°/1.8°) 0.1\mu = 4.16\mu$ The synthesis of the results obtained by the reading of the two parallel tracks can be effected by a circuit comprising, for instance, a register in which the bits of high order come from the reading of the absolute track and the bits of low order come from the reading of the incremental track.

In accordance with a variant, the optical systems described are replaced by electromagnetic systems in which the so-called incremental and absolute graduations of the two tracks of the rule are represented by zones polarized magnetically in different directions, the sensing unit being then equipped with electromagnetic detectors capable of reading these graduations in order to produce the signals required.

In accordance with another variant, the position detector in accordance with the invention is provided for an apparatus for the measuring of angular values. In this case, the detector differs from the linear version in the manner that the rule is present in the form of a disk having two concentric graduated tracks, one of which, called the incremental track, has a regular alternation of optically opaque or reflecting sectors separated by transparent spaces of the same angle as these opaque or reflecting sectors, the assembly consisting of a sector and a space forming a unit of angular step P which is regularly repeated, and the other track, called the absolute track, has a pseudo-random distribution of optically opaque or reflecting sectors and transparent spaces of the same angle constituting binary coding bits forming a continuous sequence of words which are all different from each other, and the angle of a bit being a function of the step of the graduation of the incremental track. In this case also, the optical systems can be replaced by electromagnetic systems.

We claim:

1. An absolute position detector comprising:
   a) a graduated rule;
   a first track on said rule, said first track having a regular alternation of opaque or reflecting parallel bars separated by transparent spaces, said bars and spaces having the same width, and the combination of a bar and a space forming a regularly repeating pattern of step P;
   c) a second track on said rule parallel to said first track, said second track having a pseudo-random distribution of opaque or reflecting parallel bars and transparent spaces of the same width L constituting binary coding bits forming a continuous sequence of words all different from each other, and the width L of one bar or space being a function of the step P of the pattern of the first track;
   d) a detector unit in relative motion with respect to said graduated rule;
   e) a first photoemitter on said detector unit, said first photoemitter located on one side of said rule and facing said first track;
   f) graduated graticule means on said detector unit, said graticule means located on the other side of said rule and facing said first track for sensing the pattern thereof;
   g) photodetector means on said detector unit, and photodetector means located on said other side of the rule and facing said first track to produce signals in quadrature and permit an interpolation of said signals within each step P of the pattern of the first track;
   h) a second photoemitter on said detector unit, said second photoemitter located on one side of said rule and facing said second track;
   i) linear CCD charge transfer detector means on said detector unit with a plurality of photodiodes, said linear CCD charge transfer detector means located on the other side of said rule and facing said second track to read at least one complete word formed by a definite number of successive bits of said second track and emit corresponding signals; and
   j) electronic circuit means connected to said photodetector means and to said linear CCD charge transfer detector means for processing the signals thereof and combining the information taken from the two tracks of the rule, whereby the absolute position of the relative displacement between the rule and the detector unit can be obtained at any time with a resolution resulting from the reading of the first track.

2. An absolute position detector according to claim 1, further comprising optical lengthening lens means on said detector unit arranged between said second track and said linear CCD charge transfer detector means.

3. An absolute position detector according to claim 2, wherein said optical lengthening lens means has an optical lengthening factor selected to spread the image of one bit of the second track over a number N equal to or greater than three photodiodes of said linear CCD charge transfer detector.

4. An absolute position detector comprising:
 a) a graduated rule;
 b) a first track on said rule, said first track having a regular alternation of opaque or reflecting parallel bars separated by transparent spaces having the same width, and the combination of a bar and a space forming a regularly repeating pattern of step P;
 c) a second track on said rule parallel to said first track, said second track having a pseudo-random distribution of opaque or reflecting parallel bars and transparent spaces of the same width L constituting binary coding bits forming a continuous sequence of words all different from each other, and the width L of one bar or space being a function of the step P of the pattern of the first track;
 d) a detector unit in relative motion with respect to said graduated rule;
 e) a first photoemitter on said detector unit, said first photoemitter located on one side of said rule and facing said first track;
 f) graduated graticule means on said detector unit, said graticule means located on the other side of said rule and facing said first track for sensing the pattern thereof;
 g) photodetector means on said detector unit, said photodetector means located on said other side of the rule and facing said first track to produce signals in quadrature and permit an interpolation of said signals within each step P of the pattern of the first track;
 h) a second photoemitter on said detector unit, said second photoemitter located on one side of said rule and facing said second track;
 i) linear CCD charge transfer detector means on said detector unit with a plurality of photodiodes, said linear CCD charge transfer detector means located on the other side of said rule and facing said second track to read at least one complete word formed by a definite number of successive bits of said second track and emit corresponding signals;
 j) optical lengthening lens means on said detector unit arranged between said second track and said linear CCD charge transfer detector means; and
 k) electronic circuit means connected to said photodetector means and to said linear CCD charge transfer detector means for processing the signals thereof and combining the information taken from the two tracks of the rule, whereby the absolute position of the relative displacement between the rule and the detector unit can be obtained at any time with a resolution resulting from the reading of the first track.

5. An absolute position detector comprising:
 a) a graduated disk;
 b) a first track on said disk, said first track having a regular alternation of optically opaque or reflecting sectors separated by transparent spaces, said sectors and spaces having the same angle, and the assembly of a sector and a space forming a regularly repeating pattern of angular step P;
 c) a second track on said disk concentric to said first track, said second track having a pseudo-random distribution of optically opaque or reflecting sectors and transparent spaces of the same angle constituting binary coding bits forming a continuous sequence of words all different from each other, and the angle of one sector or space being a function of the angular step P of the pattern of the first track;
 d) a detector unit in relative motion with respect to said graduated disk;
 e) a first photoemitter on said detector unit, said first photoemitter located on one side of the disk and facing said first track;
 f) graduated graticule means on said detector unit, said graticule means located on the other side of the disk and facing said first track for sensing the pattern thereof;
 g) photodetector means on said detector unit, said photodetector means located on said other side of the disk and facing said first track to produce signals in quadrature and permit an interpolation of said signals within each angular step P of the pattern of the first tract;
 h) a second photoemitter on said detector unit, said second photoemitter located on one side of said disk and facing said second track;
 i) angular detector means on said detector unit having a plurality of photodiodes, said angular detector means located on the other side of said disk and facing said second track to read at least one complete word formed of a definite number of successive bits of said second track and emit corresponding signals; and
 j) electronic circuit means connected to said photodetector means and to said angular detector means for processing the signals thereof and combining the information taken from the two tracks of the disk, whereby the absolute position of the relative displacement between the disk and detector unit can be obtained at any time with a resolution resulting from the reading of the first track.

6. An absolute position detector according to claim 5, further comprising optical lengthening lens means on said detector unit arranged between said second track and said angular detector means.

7. An absolute position detector according to claim 6, wherein said optical lengthening lens means has an optical lengthening factor selected to spread the image of one bit of the second track over a number N equal to or greater than three photodiodes of said angular detector means.

8. An absolute position detector comprising:
 a) a graduated disk;
 b) a first track on said disk, said first track having a regular alternation of optically opaque or reflecting sectors separated by transparent spaces, said sectors and spaces having the same angle, and the assembly of a sector and a space forming a regularly repeating pattern of angular step P;
 c) a second track on said disk concentric to said first track, said second track having a pseudo-random distribution of optically opaque or reflecting sectors and transparent spaces of the same angle constituting binary coding bits forming a continuous sequence of words all different from each other, and the angle of one sector or space being a function of the angular step P of the position of the first track;

d) a detector unit in relative motion with respect to said graduated disk;

e) a first photoemitter on said detector unit, said first photoemitter located on one side of the disk and facing said first track;

f) graduated graticule means on said detector unit, said graticule means located on the other side of the disk and facing said first track for sensing the pattern thereof;

g) photodetector means on said detector unit, said photodetector means located on said other side of the disk and facing said first track to produce signals in quadrature and permit an interpolation of said signals within each angular step P of the pattern of the first track;

h) a second photoemitter on said detector unit, said second photoemitter located on one side of said disk and facing sand second track;

i) angular detector means on said detector unit having a plurality of photodiodes, said angular detector means located on the other side of said disk and facing said second track to read at least one complete word formed of a definite number of successive bits of said second track and emit corresponding signals;

j) optical lengthening lens means on said detector unit arranged between said second track and said angular detector means; and k) electronic circuit means connected to said photodetector means and to said angular detector means for processing the signals thereof and combining the information taken from the two tracks of the disk, whereby the absolute position of the relative displacement between the disk and detector unit can be obtained at any time with a resolution resulting from the reading of the first track.

9. An absolute position detector comprising:
a) a graduated rule;
b) a first track on said rule, said first track having a regular alternation of parallel bars separated by spacings of the same width as said bars, said bars and spacings being formed of alternations of zones magnetically polarized in different directions, and the combination of a bar and spacing forming a regularly repeating pattern of step P;
c) a second track on said rule parallel to said first track, said second track having a pseudo-random distribution of parallel bars and spacings of the same width L constituting binary coding bits forming a continuous sequence of words all different from each other, said bars and spacings being formed of alternations of zones magnetically polarized in different alternations, and the width L of one bar or spacing being a function of the step P of the pattern of the first track;
d) a detector unit in relative motion with respect to said graduated rule;

e) first electromagnetic detecting means on said detector unit, said first electromagnetic detecting means facing said first track for reading the graduation thereof and outputting signals in quadrature to permit an interpolation of said signals within each step P of the pattern of the first track;

f) second electromagnetic detecting means on said detector unit, said second electromagnetic detecting means facing said second track for reading at least one complete word formed by a definite number of successive bits of said second track and emit corresponding signals; and g) means connected to said first and second electromagnetic detecting means for combining the information taken from the two tracks of the rule, whereby the absolute position of the relative displacement between the rule and the detector unit can be obtained at any time with a resolution resulting from the reading of the first track.

10. An absolute position detector comprising:
a) a graduated disk;
b) a first track on said disk, said first track having a regular alternation of sectors separated by spaces of the same angle as said sectors, said sectors and spaces being formed of alternations of zones magnetically polarized in different directions, and the combination of a sector and a space forming regularly repeating pattern of angular step P;
c) a second track on said disk concentric to said first track, said second track having a pseudo-random distribution of sectors and spaces of the same angle constituting binary coding bits forming a continuous sequence of words all different from each other, said sectors and spaces being formed of alternations of zones magnetically polarized in different directions and the angle of one sector or space being a function of the angular step P of the pattern of the first track;
d) a detector unit in relative motion with respect to said graduated track;
e) first electromagnetic detecting means on said detector unit, said first electromagnetic detecting means facing said first track for reading the graduation thereof and outputting signals in quadrature to permit an interpolation of said signals within each step P of the pattern of the first track;
f) second electromagnetic detecting means on said detector unit, said second electromagnetic detecting means facing said second track for reading at least one complete word formed by a definite number of successive bits of said second track and emit corresponding signals; and
g) means connected to said first and second electromagnetic detecting means for combining the information taken from the two tracks of the disk, whereby the absolute position of the relative displacement between the disk and the detector unit can be obtained at any time with a resolution resulting from the reading of the first track.

* * * * *